Patented Aug. 28, 1945

2,383,880

UNITED STATES PATENT OFFICE 2,383,880

METHOD FOR THE PRODUCTION OF POLYCONDENSATION PRODUCTS

Otto Moldenhauer and Helmuth Bock, Hirschberg, Riesengebirge, Germany; vested in the Alien Property Custodian No Drawing. Application September 4, 1940, Serial No. 355,402. In Germany July 29, 1939

2 Claims. (Cl. 260—78)

This invention relates to a method for the production of polycondensation products, and the resultant products produced therefrom, and more particularly to the production of said products as are adapted to be worked into fibers and films.

The object of this invention is the provision of a new method for the production of polycondensation products, adapted to be worked into fibers and films.

The basis of the new method and products forming the present invention, lies in the use of semi-carbazides such, for example, as thiosemi-carbazides, either by themselves alone or in combination with dicarboxylic acids or their derivatives. These compositions have been found to produce particularly good fiber-forming polymerization products.

In accordance with one form of the invention, a mass particularly adapted to the drawing of fibers may be produced by the self-condensation of pure semi-carbazides by heating the same in a high vacuum to a higher temperature.

Instead of using a semi-carbazide alone, the latter, as in the form of thiosemi-carbazide can be melted together with dicarboxylic acid or one of its derivatives. As an example of this process, one may obtain a fused mass by the double decomposition of adipinic acid anhydride with thiosemi-carbazide at a temperature of approximately 200° C., which will permit itself to be readily spun into fibers.

More specific examples of the method and products in accordance with the present invention are as follows:

Example 1

92 parts of sebacic acid anhydride are ground together with 45 parts of thiosemi-carbazide and melted together at 200° C. After a short heating period of approximately 20 minutes a decomposition takes place. There is then produced a brown-colored product having a softening point of 70° C., which can very easily be spun.

Example 2

258 parts of adipinic acid butylester and 90 parts of thiosemi-carbazide are transposed in the presence of sodium alcoholates for four hours in an autoclave at 200° C. The butanol which is produced by this process is preferably distilled off in a vacuum, and there will result a plastic, easily spinnable mass.

Example 3

128 grams of adipinic acid anhydrides are ground intimately with 75 grams of semi-carbazide and heated quickly in a vacuum of approximately 1 mm. mercury. The mixture is condensed approximately three hours until an entirely clear melt is produced.

The condensation products formed as set forth above have good plastic characteristics. They also permit themselves to be readily worked into fibers or films. The fibers so produced, however, are quite soluble in water, but this may be corrected by a special supplemental treatment as is well known in the art, if the fibers are to be used for textile purposes.

From the foregoing it is believed that the gist of the present invention will be entirely clear to those skilled in this art, and it is to be noted that while certain specific compositions have been named in certain particular examples, this has been done merely by way of example, and it is not intended that the invention should be limited thereto except as required by the following claims:

We claim:

1. The method of producing polycondensation products of the type adapted for working into fibers and films which consists in mixing thiosemi-carbazide with sebacic acid anhydride and melting them together at approximately 200° C.

2. The method of producing brown colored, easily spinnable polycondensation products having a softening point of about 70° C. which consists in grinding about two parts of sebacic acid anhydride with about one part of thiosemi-carbazide and heating for a short time whereby the mass may be readily worked into fibers and films.

OTTO MOLDENHAUER.
HELMUTH BOCK.